Oct. 1, 1963  A. R. BARRINGER  3,105,934
METHOD AND APPARATUS FOR THE REMOTE DETECTION OF ORE BODIES
UTILIZING PULSES OF SHORT DURATION TO INDUCE
TRANSIENT POLARIZATION IN THE ORE BODIES
Filed Jan. 5, 1960  9 Sheets-Sheet 1
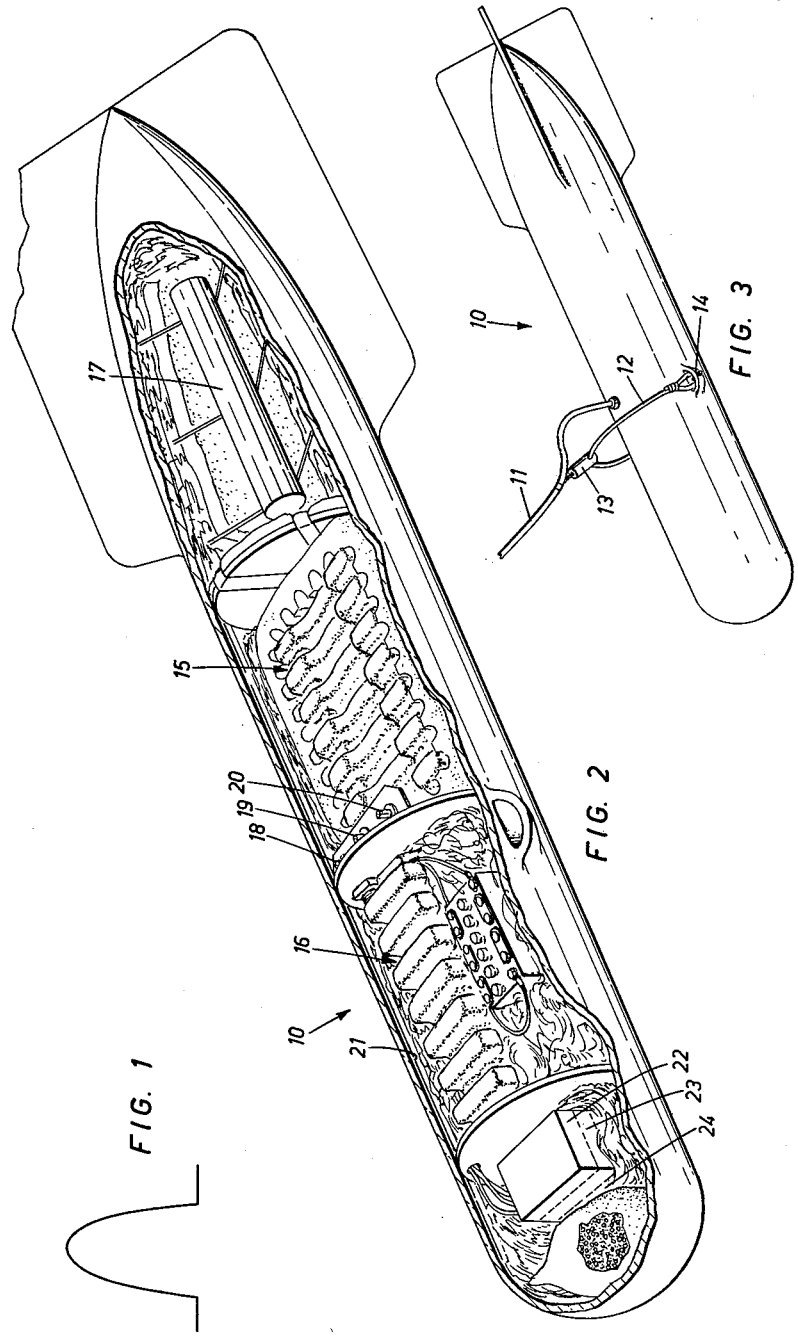
Inventor
ANTHONY R. BARRINGER
by: Cavanagh & Norman Inventor
ANTHONY R. BARRINGER
by: Bavanagh & Norman Oct. 1, 1963 A. R. BARRINGER 3,105,934
METHOD AND APPARATUS FOR THE REMOTE DETECTION OF ORE BODIES
UTILIZING PULSES OF SHORT DURATION TO INDUCE
TRANSIENT POLARIZATION IN THE ORE BODIES
Filed Jan. 5, 1960 9 Sheets-Sheet 3

10 SECONDS 0  400  800  MICROSECONDS

*Inventor*
ANTHONY R. BARRINGER by: Cavanagh & Norman

Oct. 1, 1963 A. R. BARRINGER 3,105,934
METHOD AND APPARATUS FOR THE REMOTE DETECTION OF ORE BODIES
UTILIZING PULSES OF SHORT DURATION TO INDUCE
TRANSIENT POLARIZATION IN THE ORE BODIES
Filed Jan. 5, 1960 9 Sheets-Sheet 4

Inventor
ANTHONY R. BARRINGER by: Cavanagh & Norman

Oct. 1, 1963  A. R. BARRINGER  3,105,934
METHOD AND APPARATUS FOR THE REMOTE DETECTION OF ORE BODIES
UTILIZING PULSES OF SHORT DURATION TO INDUCE
TRANSIENT POLARIZATION IN THE ORE BODIES
Filed Jan. 5, 1960  9 Sheets-Sheet 5

Inventor
ANTHONY R. BARRINGER

Inventor

ANTHONY R. BARRINGER

Oct. 1, 1963

A. R. BARRINGER 3,105,934

METHOD AND APPARATUS FOR THE REMOTE DETECTION OF ORE BODIES
UTILIZING PULSES OF SHORT DURATION TO INDUCE
TRANSIENT POLARIZATION IN THE ORE BODIES

Filed Jan. 5, 1960

Inventor
ANTHONY R. BARRINGER by: Cavanagh & Norman

United States Patent Office 3,105,934
Patented Oct. 1, 1963

3,105,934
METHOD AND APPARATUS FOR THE REMOTE DETECTION OF ORE BODIES UTILIZING PULSES OF SHORT DURATION TO INDUCE TRANSIENT POLARIZATION IN THE ORE BODIES
Anthony Rene Barringer, Agincourt, Ontario, Canada, assignor, by mesne assignments, to Selco Exploration Company Limited, Toronto, Ontario, Canada
Filed Jan. 5, 1960, Ser. No. 551
18 Claims. (Cl. 324—4)

This invention relates to a method and apparatus for the remote detection of conducting bodies.

Present day airborne electromagnetic geophysical systems normally operate by continuously transmitting one or more audio-frequencies from coils mounted on aircraft, and detecting the secondary response from conductors in the ground by using receiving coils mounted on the aircraft or towed behind in a bird. Since the wave forms transmitted are continuous, it is necessary to detect the secondary field in the presence of the primary field which involves elimination of the primary field from the receiving system. This is generally achieved by one of two methods: Firstly by holding the receiving and transmitting coils in some fixed orientation relationship and electronically balancing out the component of the primary field detected in the receiving coil, or secondly by eliminating all components which are in phase with the transmitted field and detecting only that component in the receiving coil which may be resolved into quadrature phase relationship with the transmitted field. The receiving coils may be mounted in the plane or towed behind in a bird. If the receiver is mounted in the aircraft, the sensitivity of the receiving coil to vibration and attendant variations in the pick-up of the transmitted field is acute since minute movements of the receiving coil will strongly modulate the coupling with the transmitted field. Where quadrature components only are measured, a high noise is introduced by close coupling of the receiver coil in the plane with quadrature components of the induced currents in the metal aircraft frame. If the receiving coil is towed behind the plane in a bird, limitations on sensitivity are determined by the inevitable variations in position of the bird in relation to the aircraft and the geometry of the transmitted field. Only the pure quadrature system after suitable compensation for the aircraft frame currents is virtually free from misorientation noise when a towed bird is used and this system suffers the disadvantage that considerable information is lost when only quadrature measurements are made. Some attempts have been made to overcome the latter disadvantage by the use of two frequencies simultaneously, the quadrature responses at two frequencies being equated as roughly the same as the use of in-phase and quadrature measurements at one frequency. This technique however is not wholly satisfactory because different current paths are energized at different frequencies in naturally occurring conductors in the ground and consequently the interpretation of the results is considerably increased in ambiguity.

Another limitation of quadrature systems together with all existing airborne electromagnetic systems is that in practice the receiving coil must be used in maximum coupling with the transmitted field since slight changes in orientation in the position produce a much smaller percentage change in coupling (a function of the cosine of the displacement angle) than in other positions, particularly as compared with the null coupling position (a function of the sine of the displacement angle). Consequently, existing airborne electromagnetic systems almost exclusively measure the one component of the secondary field which is resolved along the direction of the axis of the receiving coil.

In contrast to the above, it has been found that it is possible with the present invention in which transient responses are used, to measure the secondary field of a conductor during a period when the primary field is either absent or not time varying, regardless of the orientation of the receiving coil.

Using this technique, it becomes possible to measure secondary fields without any noise levels due to the interference of the primary field regardless of variations in coupling between the receiving and transmitting coils. Furthermore, all three components of the secondary field can be measured using three mutually perpendicular receiving coils. This added information is of value for the following reasons. Firstly, universal coupling is maintained with conductors in the ground regardless of flight direction. In other systems conductors may be missed if they are accidently crossed at an angle where the receiving coil is in null coupling with the ground conductor. Secondly, information can be deduced from the three component responses on the dip of the ground conductor enabling positive discrimination between conductive overburden such as swamp and dipping conductors of possible economic value.

A further very important advantage of the invention as compared with other airborne electromagnetic systems, particularly of the quadrature or out of phase type, is that transient analysis gives information on the inductive response equivalent to the use of a large number of frequencies. When two conductors are present, such as is commonly the case when a dipping conductor underlies conductive swamp or clay, the true conductivity of the underlying conductor can be estimated without modification by the overlying conductor.

The invention also has application in the domain of radio frequencies such as microwaves where it is possible to make measurements pertaining to the amplitude and conductivity on reflected radar type wave forms, or wave forms showing abrupt terminations, without reference to the phase of the transmitted signal and the travel time to and from the reflected surface.

Accordingly, it is amongst the objects of the invention to provide a method and apparatus for the measurement of the secondary field of a conductor whilst the primary field is eliminated.

It is further amongst the objects of this invention to provide a method and apparatus for the measurement of the secondary field of a conductor regardless of the orientation of the receiving coil.

It is also amongst the objects of this invention to provide a method and apparatus for the measurement of the secondary field of a conductor utilizing a discontinuous electromagnetic wave form to energize the conductor.

Further objects and advantages will become apparent from a consideration of the following description having reference to the drawings in which:

FIGURE 1 shows a single current pulse wave form of the type circulating in the transmitting loop;

FIGURE 2 shows a partially cut away perspective view of a three receiving coil bird according to the invention;

FIGURE 3 shows a perspective view of the suspension means for the bird;

Figure 4:
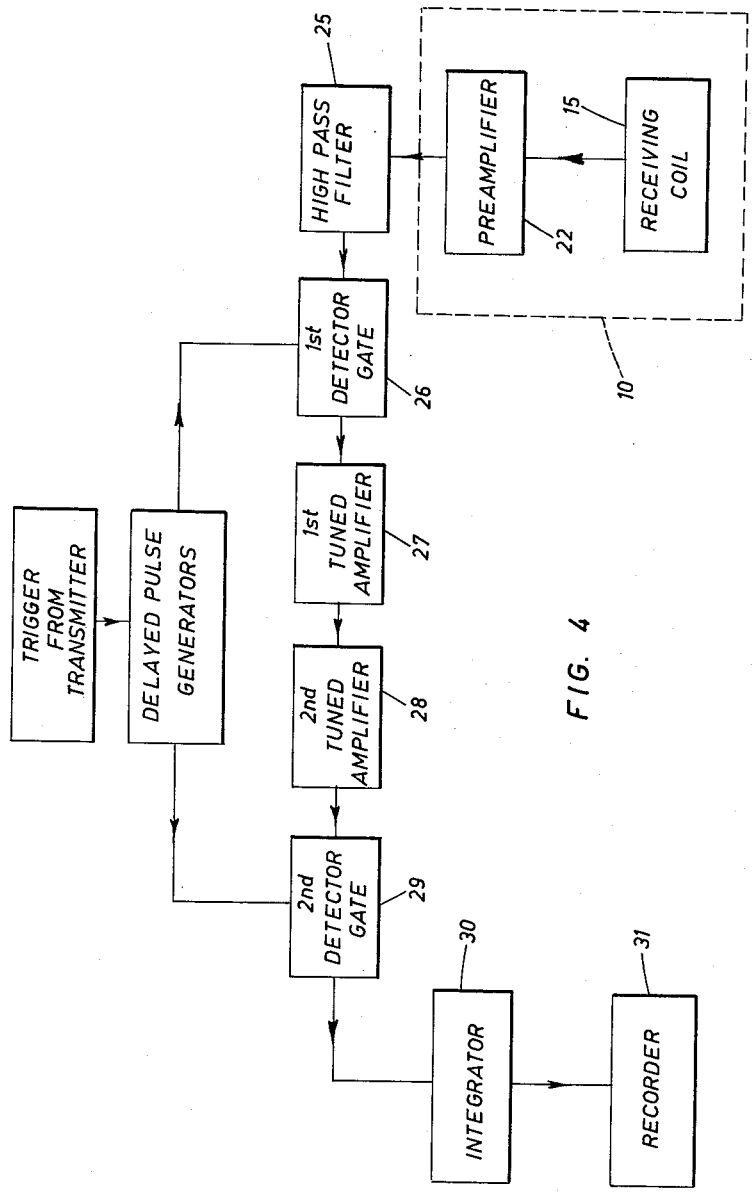
FIGURE 4 shows a block diagram of one channel of the receiving system of the invention.

Referring now to the drawings, current pulses of the form shown in FIGURE 1 are generated by a pulse generator adapted to produce 80 pulses per second normally into a loop transmitter thereby radiating a pulsed electromagnetic field. Primary current pulse is seen as a differentiated wave form when detected as voltage in a receiving coil.

Figure 17:
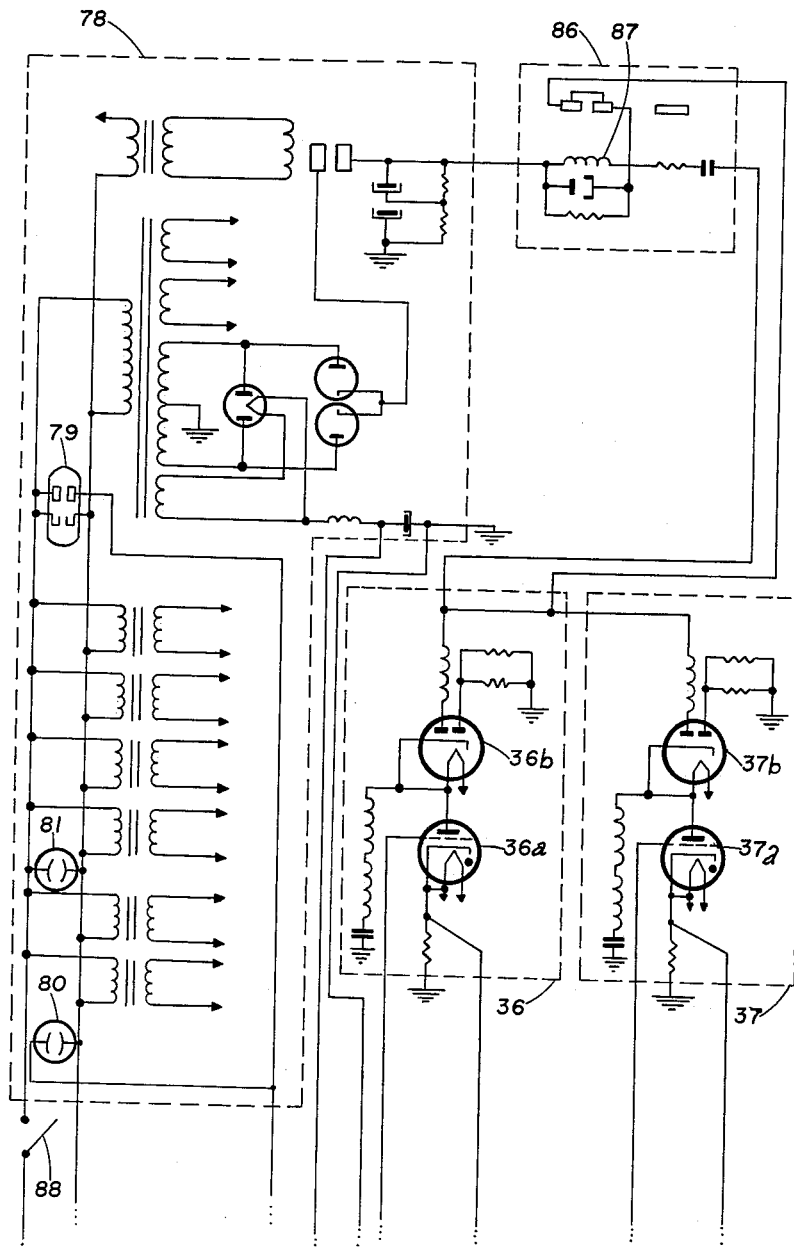
FIGURES 17 and 17a show in two parts a schematic wiring diagram giving details of a pulse generator transmitter circuit suitable for use with the present invention.

A circuit diagram for a transmitter suitable for use with the instant invention is shown in FIGURE 17. The loop of the transmitter may be mounted on an aircraft (not shown).

The bird 10 shown in FIGURES 2 and 3 is adapted to be towed by cable 11 at a distance of about 500 feet from an aircraft (not shown). The suspension of bird 10 is shown in more detail in FIGURE 3. The cable 11 which contains the electrical connections and tow cable is joined to an elastic shock cord 12 by suitable means at 13. The elastic shock cord 12 forms a loop which is joined at its ends to each side of the bird as at 14 by suitable means such as a bolt arrangement. The shock cord 12 is formed of a heavy elastic cord in a woven casing and is designed to isolate cable vibration from the bird. The bird 10 contains three inductive detectors in the form of three ferrite cored coils 15, 16 and 17 wound to a resonant frequency of 12 kc. Coil 15 is the vertical longitudinal coil responsive to the horizontal component of fields resolved in the direction of flight. Coil 16 is the horizontal coil responsive to the vertical component of fields and coil 17 is the vertical transverse coil responsive to the horizontal component of fields at right angles to the direction of flight. In actual practice, coils 15 and 16 may consist of a plurality of coils wound on short ferrite rods and joined together in series in ladder fashion. In this way, a suitable saving of space may be effected within the bird 10. The coils may be coated in silicone rubber which cures at room temperature and must be very carefully acoustically isolated with felt and foam rubber to minimize microphonics. Each of the coils 15, 16 and 17 is independently critically damped by means of adjustable potentiometers 18, 19 and 20. The inside of the bird 10 is provided with Faraday shielding 21 further to reduce interference, the Faraday shielding being grounded through cable 11.

Three pre-amplifiers 22, 23 and 24 having a frequency response of 5 c.p.s.–20 kc. are provided for the coils 15, 16 and 17. The amplifiers should have good transient response and noise level not more than 10 microvolts peak to peak at the input.

The concept of the separation of transients involves time gating in the receiver system of the type shown in FIGURE 4. In the case of audio-frequencies where conductors are being detected at relatively short range using induction fields, the return signal is delayed only an insignificant portion of time with respect to the overall dimensions of the transmitted wave form. The gate may therefore be initiated by triggering circuits associated directly with the transmitter. When radio frequencies are involved in radio type applications and where measurements are being made on a return pulse which may be delayed substantially in time with respect to the outgoing pulse, it becomes necessary to trigger the gates by the leading edge of the return pulse.

Figure 18:
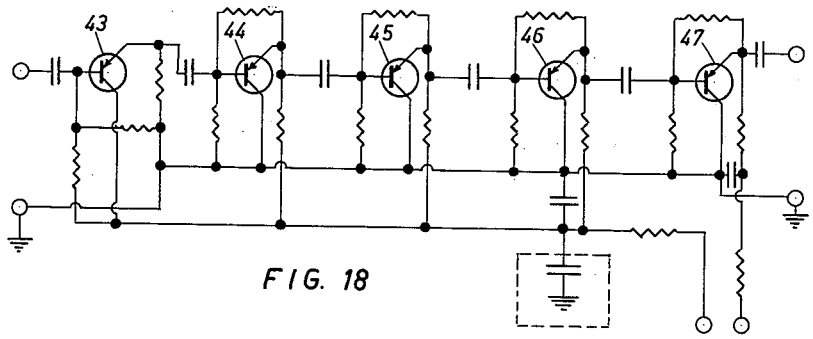
FIGURE 18 shows a schematic wiring diagram of a pre-amplifier for the signals received in the receiving coils suitable for use with the present invention.

Referring now to FIGURE 4, a block diagram of the circuitry of a single channel is shown. (An example of the wiring diagram of the receiving portion of the circuitry shown in FIGURE 4 is given in FIGURE 19.) The use of multiple channel detection is considered more fully hereafter. Signals from a coil such as 15 in the bird 10 pass through the corresponding pre-amplifier 22. (By way of an example a schematic wiring diagram for a pre-amplifier suitable for use with the present invention is shown in FIGURE 18.) A high pass filter 25 having a low cut-off frequency of ten c.p.s. is interposed between the amplifier 22 and first detector gate 26. The high pass filter 25 passes the received pulse and secondary field transient without distortion. It filters out the low frequency signals generated by the movement of the bird 10 and its receiving coils in the earth's magnetic field.

The first detector gate 26 is conveniently adjustable between 20 microseconds and 1 millisecond in width with normal operation of 100 microseconds. It is arranged to take a sample of the signal detected immediately following the transmitted pulse. Thus, if any secondary transient field is present, it will be detected.

Figure 5:
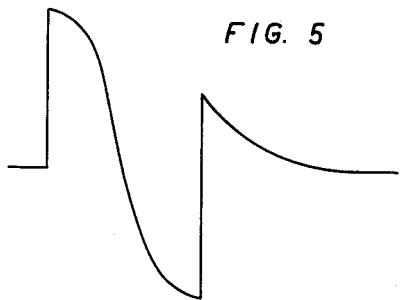
FIGURE 5 shows a received wave form of a primary pulse followed by a transient field response from a conductor of high conductivity.
Figure 6:
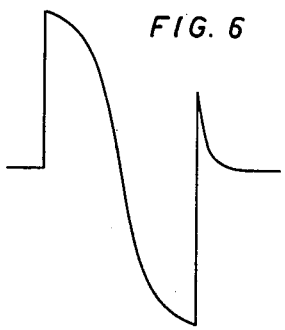
FIGURE 6 shows a similar received wave form followed by a transient field response from a conductor of low conductivity.

First and second tuned amplifiers 27 and 28 are two amplifiers arranged in series and tuned to the same frequency as the pulse repetition rate. Pulses are received at the tuned frequency of the amplifiers from the first detector gate. Thus, if the first detector gate is sampling random noise, it will pass signals of randomly varying polarity and amplitude which will tend to integrate out in the tuned amplifiers 27 and 28. If, however, the first detector gate is sampling a transient secondary field, as shown by the wave form of FIGURE 5 the signal will cohere and generate an 80 c.p.s. signal in the tuned amplifiers.

Figure 7:
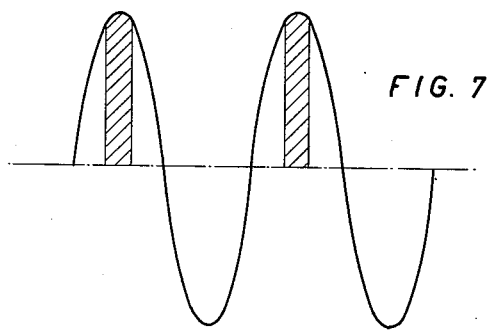
FIGURE 7 shows a wave form of the signal received from the tuned amplifiers and the position of secondary detection gating.

The second detector gate 29 samples the output of the tuned amplifiers at a repetition rate locked to the transmitted pulse rate, i.e., to the tuned frequency of the amplifiers. An illustration of the signal and gating is shown in FIGURE 7. The second detector gate is designed to be adjustable in width from 20 microseconds to 10 milliseconds. It is also adjustable in phase so that samples are taken at the peaks of the sine wave from the tuned amplifiers as shown.

The integrator 30 consists of a passive low pass filter network arranged to convert the pulse from the second detector gate into a slowly fluctuating D.C. signal. The time constant of the low pass filter or integrator 30 is conveniently adjustable between 1 and 4 seconds. The integrator or low pass filter 30 has the function of integrating coherent signals over the period of the time constant of the network whilst tending to integrate out and destroy noise fluctuations of random polarity which manage to pass the tuned amplifier system. The longer the time constant the narrower the effective bandwidth of the system and the greater the reduction in noise.

Figure 8:
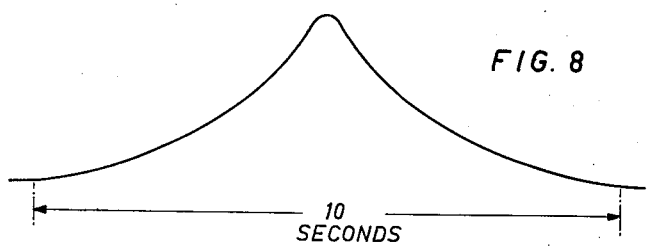
FIGURE 8 shows a typical recorded response on a single channel picked up during flight traverse across a conductor.

Normally, a two second time constant would be used for traversing at 500 feet above ground level. FIGURE 8 shows a typical anomaly detected at 500 feet with the plane flying at 100 miles per hour from which it can be seen that the length of the time constant of the integrator may be increased to a maximum of 4 seconds to smooth out the signal and reduce noise variations, but if the time constant is made too long (e.g. 10 seconds) the shape of the anomalies produced by conductors below the plane will be seriously distorted.

The recorder 31 is most conveniently of the high sensitivity mirror galvanometer type. A typical such recorder which would be suitable for use with the present invention is the Visicorder (a trademark of Honeywell Controls Ltd.) model 1012, manufactured by Honeywell Controls Ltd. This has the advantage of eliminating D.C. amplifiers from the system with the concomitant simplification of the system and elimination of the risk of trouble occasioned by D.C. drift.

Moreover, the mirror galvanometer permits the use of passive rather than active inegrators. It also utilizes high intensity ultra violet lamps and special paper thus permitting direct recording without the need for chemical developers.

Figure 16:
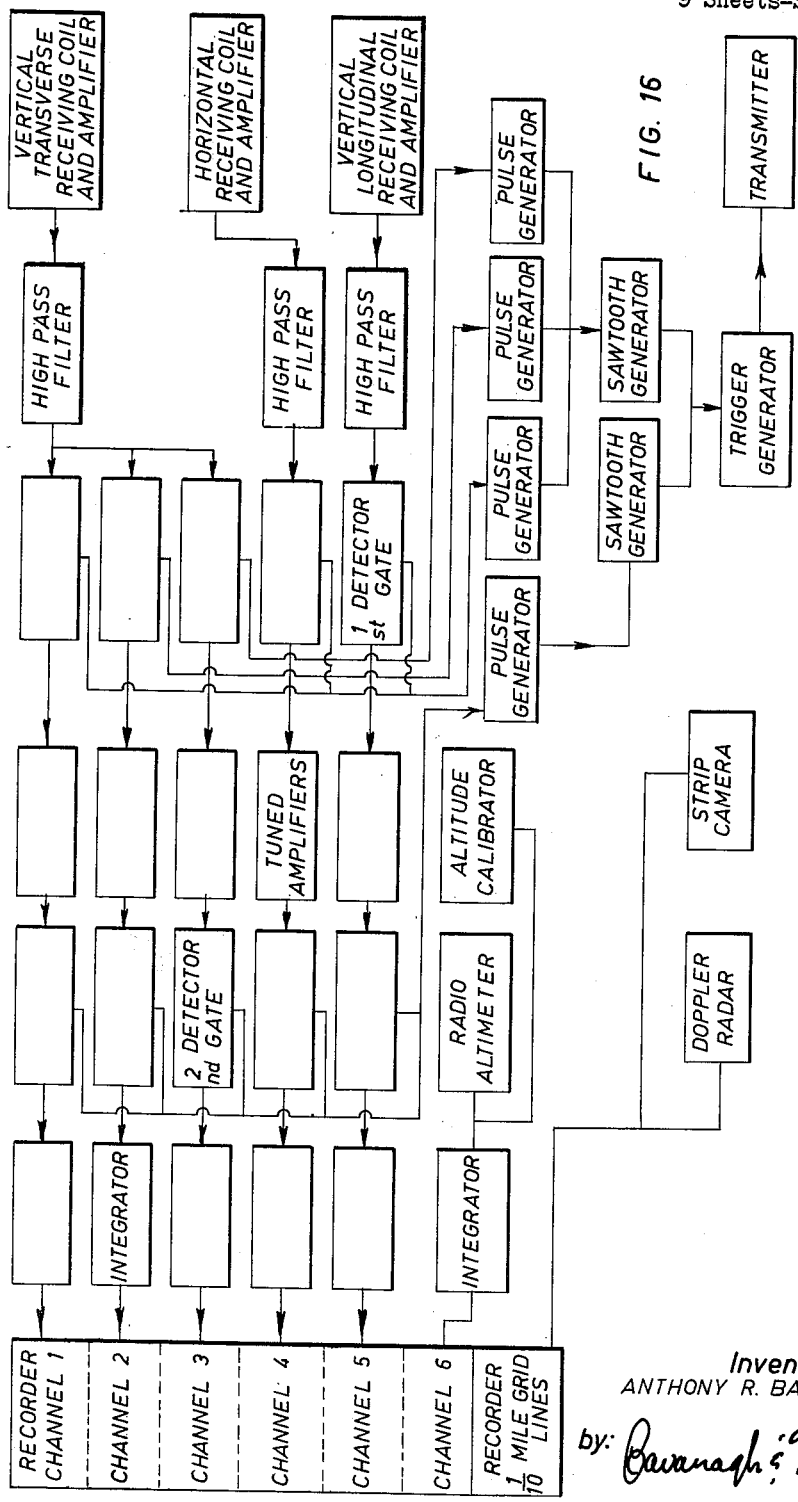
FIGURE 16 shows a block diagram of an electromagnetic detecting system of the invention utilizing multiple channels.

The above description relates to the receiving of pulses from a single coil. It will be appreciated that separate channels are used to record the responses of each coil. Moreover, if more than one primary gating is to be sampled from each coil, it will require a separate channel to effect this. A schematic block diagram showing multiple channels is illustrated in FIGURE 16.

Thus it can be seen that by utilizing three coils such as 15, 16 and 17, it is possible to measure all the components of the secondary field. Flat conductors give a different ratio of response in the vertical and horizontal coils and a different relative positioning of the peak response as compared with inclined conductors. Thus by measuring all the components of the secondary field it is possible to estimate an orientation of the conductor in the ground and recognize the conductive bottoms of lakes and swamps and differentiate them readily from dipping conductors.

Figure 10:
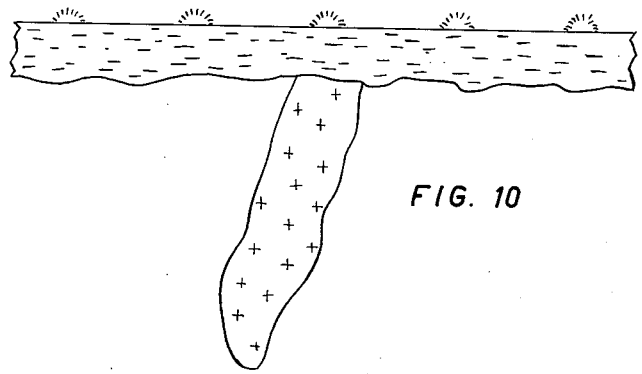
FIGURE 10 shows a typical orientation of an ore body of good conductivity underlying swamp of poor conductivity.

A more complicated situation arises in the case of conductors disposed as shown in FIGURE 10, i.e. an ore body of good conductivity underlying a body of poor conductivity such as a swamp. A consideration of the manner of distinguishing such a situation according to the present invention will be more readily understood from the following discussion of the principle of measurement of the conductivity of conductors.

The measurement of the conductivity of conductors is based upon the estimation of the time constant of the decaying transient produced when the conductor is energized with a pulse. Normally an ore body consisting of base metal values occurring in a massive sulphide deposit may be considered as a conductive sheet in which circulating current will be induced in the presence of a time varying electromagnetic field. In general a current pulse of the type shown in FIGURE 1 circulating in a transmitting loop adjacent to a conductive sheet will induce a similar current pulse in the conductive sheet. This pulse will tend to circulate in the loop formed by the periphery of the sheet. Transient effects at the termination of the pulse will be similar to the transient decay of current in a coil or a loop of wire. The current will decay exponentially in the following manner.

Let the current after a time $t$ after termination of the pulse$=i(t)$.
Let the voltage of the termination of the pulse$=V$.
Let the resistance of the current loop$=R$.
Then $$i(t) = \frac{Ve^{\frac{-Rt}{L}}}{R}$$

When $$t = \frac{L}{R}$$

the exponent equals $-1$ and the current has fallen to 36.8% of its value at the moment of final collapse of the energizing field.

The value of $$t = \frac{L}{R}$$

is defined as the time constant $T_c$ of the circuit.

In a conducting sheet L is a function of the size of the sheet and the current loop which circulates around its periphery. R is a function of the specific resistivity of the material of the sheet and its thickness. As an approximation for a given conductive material and a given thickness of sheet, the time constant $L/R$ is constant since L and R both vary linearly with the distance around the circulating current loop. Hence a measurement of the time constant gives a measure of the conductivity characteristics of a sheet which aids in the recognition of varied ore deposits. For a simple sheet the time constant is directly related to the measurement of phase shift made with a continuous wave system.

In the case where disseminated sulphide particles are present in a naturally occurring conducting mass or sheet, the transient effects cannot be approximated solely by considering them in terms of inductance and resistance. Polarization effects and capacitance effects occur at the interface of the conductive sulphide particles with the enclosing rock material. These effects are recognized by exceptionally long decay periods and are of considerable diagnostic value. The evaluation of polarization and capacitance effects is virtually impossible with a single frequency continuous wave approach.

Figure 9:
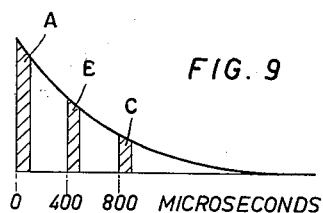
FIGURE 9 shows a simple transient field response from a single conductor illustrating the positioning of samples which may be taken by the first detector gates.

The time constants of conductors are measured in principle by using two channels in which samples A and B are taken with a time separation occurring between them (see FIGURE 9). Since the transient has an exponential form the ratio of $A/B$ is the same for all parts of the curve having a fixed time separation and the ratio of $A/B$ is related to the time constant.

Let the initial voltage$=V$.
Let the voltage after time $t_1=A$.
Let the voltage after time $t_2=B$.
Let $Tc=$time constant of transient.
Then in the general case for an exponential decay $$\text{Voltage after time } t = Ve^{\frac{-t}{Tc}}$$

Therefore $$A = Ve^{\frac{-t_1}{Tc}}$$

$$B = Ve^{\frac{-t_2}{Tc}}$$

Therefore $$\frac{A}{B} = \frac{Ve^{\frac{-t_1}{Tc}}}{Ve^{\frac{-t_2}{Tc}}} = e^{\frac{t_2-t_1}{Tc}}$$

Therefore $$\log e \frac{A}{B} = \frac{t_2 - t_1}{Tc}$$

or $$Tc = (t_2 - t_1) \log e^{-1} \frac{A}{B}$$

The following are some typical values of time constant for various ratios of $A/B$ assuming a separation of 100 microseconds between A and B.

When $\frac{A}{B} = 1.23$  $Tc = 500$ microseconds $= 1.3$  $Tc = 400$ microseconds $= 1.4$  $Tc = 300$ microseconds $= 1.65$  $Tc = 200$ microseconds $= 2.0$  $Tc = 140$ microseconds $= 2.8$  $Tc = 100$ microseconds $= 3.5$  $Tc = 80$ microseconds The time constant for naturally occurring ground conductors varies considerably and the following may be taken by way of a guide:

| Time Constant | Classification of Conductor |
| --- | --- |
| 20-100 Microseconds | Poor, e.g. conductive swamp, lake water, etc. |
| 100-200 Microseconds | Medium, e.g. weakly mineralized shear zones, lake bottom silts, conductive clays. |
| 200 Microseconds-1 Millisecond | Good, e.g. massive sulphide ore bodies, barren sulphides, graphite. |
| Over 1 Millisecond | Polarizing conductor. Disseminated sulphide deposits exhibiting capacity and induced polarization effects. |

From the foregoing it will be understood that the term conductor as used in this specification includes both electrical conductors and polarizing conductors.

However, it will be appreciated that all transient wave forms will not be of a simple nature. The presence of disseminated sulphide particles or the presence of two conductors disposed as shown in FIGURE 10 will cause variations in the transient wave form, as illustrated by the transient wave form shown in FIGURE 11.

Figure 11:
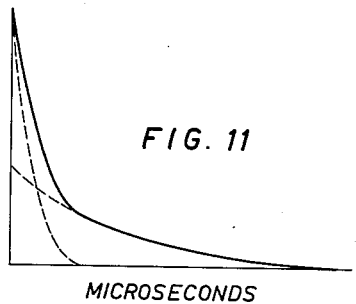
FIGURE 11 shows a complex transient wave form arising from two conductors, one of high conductivity and the other of low conductivity similar to the bodies illustrated in FIGURE 10, broken lines illustrate the two component transients which make up the resultant complex transient.

In the case of complex transients of the form shown in FIGURE 11, it will be seen from the figure that the left-hand or steep portion of the curve represents a short time constant arising from a poorly conductive overburden. The lower right-hand part of the curve shows a long time constant arising from an underlying good conductor.

Figure 12:
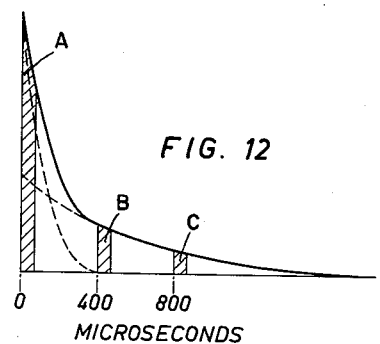
FIGURE 12 shows a complex transient wave form illustrating positioning of three first detector gate samplings.

In order to measure complex transients, it is necessary to take three samples, A, B and C. (See FIGURE 12.) It will be apparent that for a simple exponential transient $$\frac{A}{B} = \frac{B}{C} \text{ or } AC = B^2 \text{ or } \frac{AC}{B^2} = 1 \text{ (See FIGURE 9)}$$

For a complex transient involving a mixture of exponential curves $AC/B^2$ is equal to a ratio greater than 1. Thus the ratio $AC/B^2$ can be used to determine the degree of complexity of the transient. The ratio of $A:B$ and $B:C$ and $AC:B^2$ may be obtained electronically.

The long tail of a transient response from a good conductor underlying a poor conductor as shown in FIGURE 10 is a major feature of the invention. A relatively undistorted estimate of conductivity of a conductor masked by swamp and the like may be made. In present day continuous wave systems using only one frequency for in phase and quadrature measurement or two frequencies for quadrature measurement only, conductivity estimates based on phase shifts are severely distorted by the presence of conductive overburden since mixed phases cannot be separated.

Figure 13:
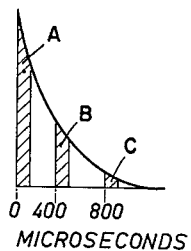
FIGURE 13 shows typical triple first detector gate samplings of the transient wave response received from the vertical transverse coil.
Figure 14:
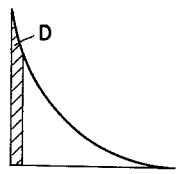
FIGURE 14 shows typical single first detector gate sampling of the transient wave response received by the horizontal coil.
Figure 15:
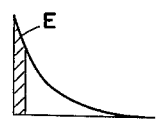
FIGURE 15 shows typical single first detector gate sampling of the transient wave response received by the vertical longitudinal coil.

In the present invention the parameters of a complex transient are most conveniently measured on the vertical transverse coil. Three signal samples A, B and C are taken as shown in FIGURE 13 and fed to respective channels designated 1, 2 and 3. By the use of suitable delays the ratios of signal B in channel 2 to signal C in channel 3 can be used to make a rapid determination of the true conductivity of masked conductors (see FIG. 12). If channel 1 is set immediately to follow the pulse and channel 2 is delayed 400 microseconds and channel 3 is delayed a total of 800 microseconds, channel 2 and channel 3 will not receive any signal from conductors of low conductivity due to the short time constant of the transient response received therefrom (see column 7, supra) conductive swamp, clay or lake bottoms. They will however detect good conductors masked thereby and also disseminated sulphide zones of low conductivity which exhibit long transients due to polarization and self capacity effects. Disseminated sulphides can form commercial ore bodies and the invention gives a new approach to their discrimination from the far more numerous other types of low conductivity conductors. Signal samples D and E shown in FIGURES 14 and 15 are derived from the horizontal and vertical longitudinal coils respectively and are fed to respective channels 4 and 5. They are not used to measure conductivity parameters of the conductors, but solely to assist in the determination of the orientation of the conductors both in respect to the horizontal and in respect to the direction of the flight line traverse.

Figure 20:
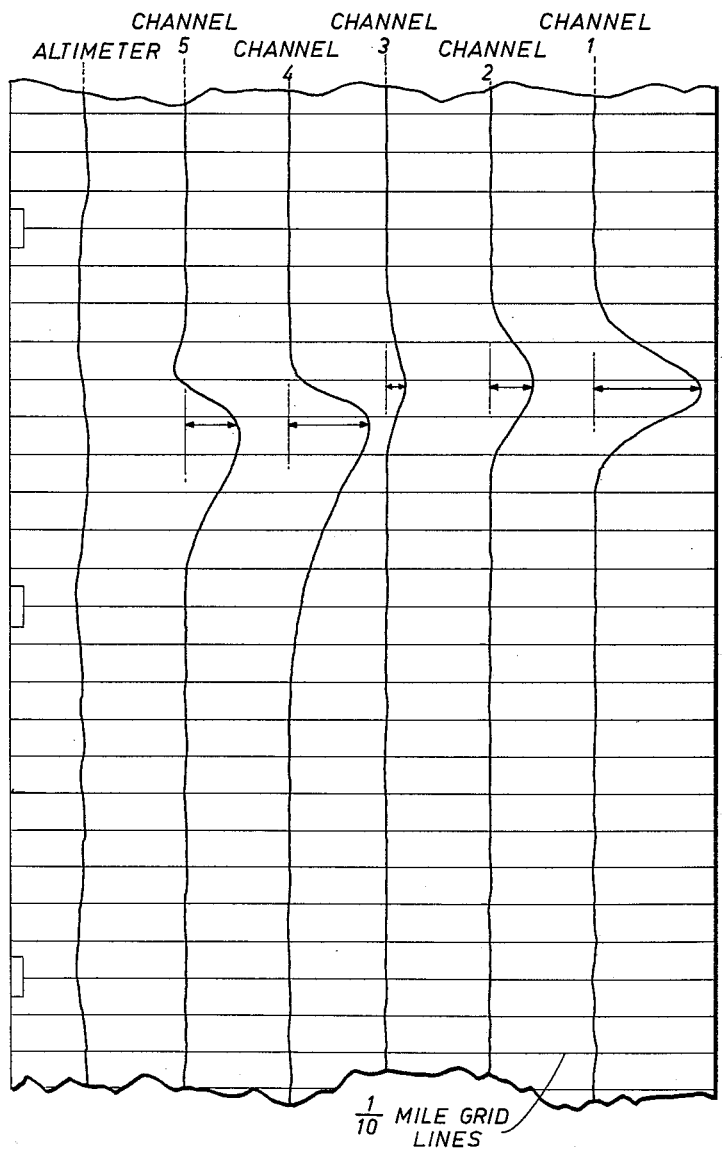
FIGURE 20 shows an example of the type of recording obtained according to the present invention.

A typical illustration of the type of recording obtained using all five channels is illustrated in FIGURE 20. As previously explained, the deviations in the recordings on channels 1, 2 and 3 are utilized to determine the nature of the conductor whilst the deviations in the recordings on channels 4 and 5 give additional information as to the orientation of the conductor.

The complete system may also include a Doppler radar navigation system for facilitating accurate survey traversing in parallel traverse spaced a quarter of a mile apart. Marker pulses are provided every one tenth of a mile from the Doppler radar and these are recorded on the geophysical recorder facilitating computations on depth and dip based on the profiles recorded.

A radar altimeter is used to provide a continuous recording alongside the geophysical profiles of ground clearance. This enables correction for flying height to be carried out. Normal survey flying height is 500 feet.

A continuous strip 35 mm. camera is used to photograph all the ground surveyed and fiducial numbers provided by an output from the Doppler radar are simultaneously recorded on the camera and on the geophysical recorder. This feature enables geophysical anomalies to be located on a map prepared from aerial photographic mosaics with an accuracy of better than plus or minus 200 feet.

Figure 17A:
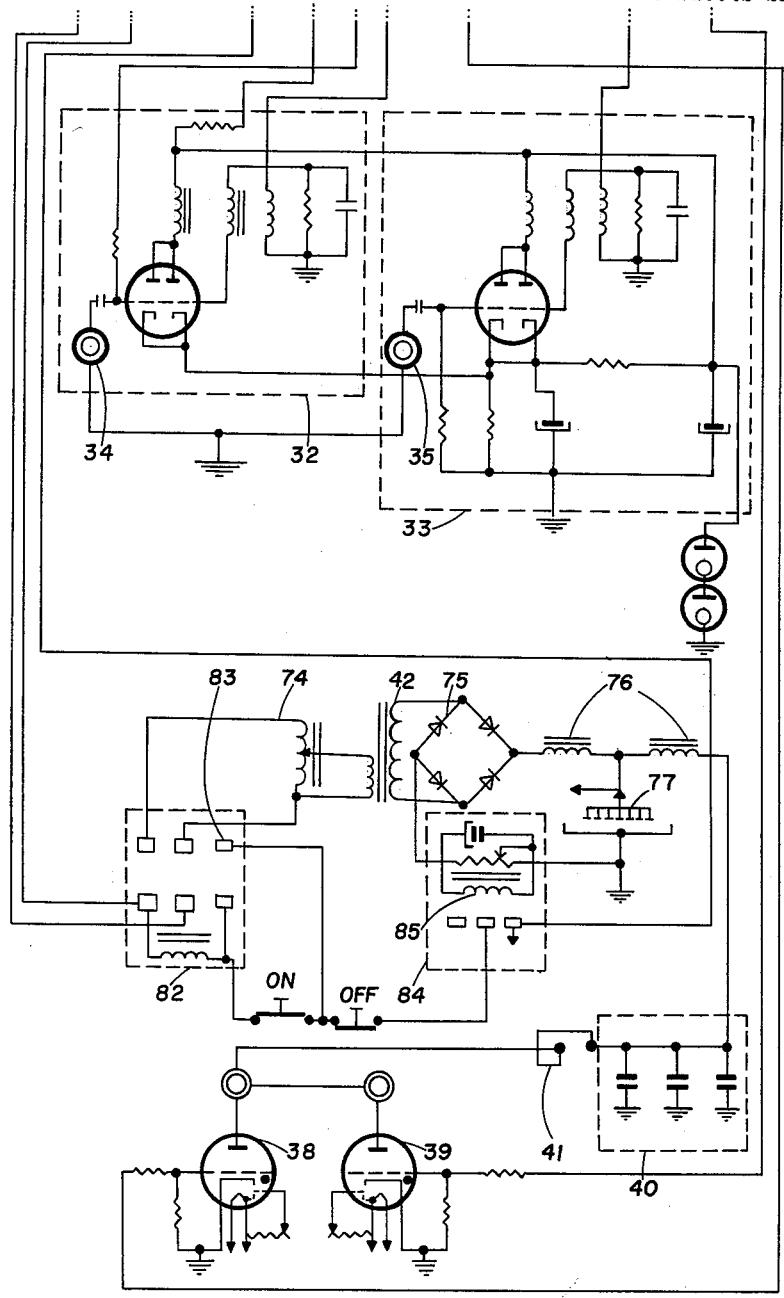

Referring now to the circuit diagrams shown in FIGURES 17, 17a, 18 and 19, the pulse transmitter is shown in FIGURES 17 and 17a. It consists essentially of a thyratron pulse generator in which the inductive part of the pulse forming network consists of an electromagnetic radiating loop or magnetic dipole.

Two blocking oscillators indicated generally by references 32 and 33 are triggered from an external low level trigger source (not shown) provided at terminals 34 and 35. Blocking oscillators 32 and 33 in turn develop respective output pulses which are then amplified by respective pulse amplifiers indicated generally by references 36 and 37, each of which comprises a small thyratron, 36a and 37a, and a clipping diode 36b and 37b. The amplified pulses are then communicated to the large thyratrons 38 and 39 and provide triggering pulses therefor which in turn will permit discharge of capacitor bank 40 through radiating loop 41, thus providing the desired pulse therein of high amplitude and of short duration.

Capacitor bank 40 is then re-charged by a D.C. power supply comprising the power transformer 42, the input side of which is connected through a suitable variable auto transformer 74 to an A.C. source (not shown). The outlet side of transformer 42 is fed to the full wave rectifier 75 which in turn is provided with two filter chokes 76 and connected to the filter capacitor bank 77 and re-charges the same during the zero portion of the pulse transmitter cycle.

It will also be noted that blocking oscillators 32 and 33, pulse amplifiers 36 and 37 and thyratrons 38 and 39 are provided with D.C. power from an auxiliary D.C. source generally indicated by reference 78. Source 78 is of generally conventional design, incorporating a time delay relay 79 which remains open until operating temperature is reached, and further incorporating the ready light 80 indicating that relay 79 is closed, and warning light 81 indicating that the circuit is "on."

In addition to the foregoing the instant pulse transmitter incorporates further safety devices to minimize breakrown hazards.

Thus relay 82 is provided, including contact 83 which is designed to operate only when relay 79 has closed and ready light 80 has come on indicating that the transmitter is ready for operation, and will then close on momentary depression of the "on" switch and open on momentary depression of the "off" switch, thus making and breaking the supply of power to autotransformer 74.

Interlock 84 is provided, consisting essentially of cut out relay 85 which is designed to remain normally closed during operation and to open when thyratrons 38 and 39 break down and remain conductive.

Similarly interlock 86 is provided consisting essentially of cut out relay 87 which is also designed to remain normally closed during operation and to open when thyratrons 36a and 37a break down and remain conductive. Disconnect switch 88 controls the supply of power to power supply 78.

The transmitter described above is designed to give a minimum average power dissipation in the loop of 2 kv. a.

The pre-amplifier shown in FIG. 18 is a low noise type with approximately 70 db of gain, the principal components of which are the transistors 43, 44 and 45 which art type 2N207B, low noise audio frequency PNP transistors and transistors 46 and 47 which are type 2N44 audio frequency PNP medium power transistors. The amplifier is class A throughout and has a frequency responses of 5 cycles to 20 kilocycles plus or minus 2 db. The amplifier of FIGURE 18 is housed in the bird.

Figure 19:
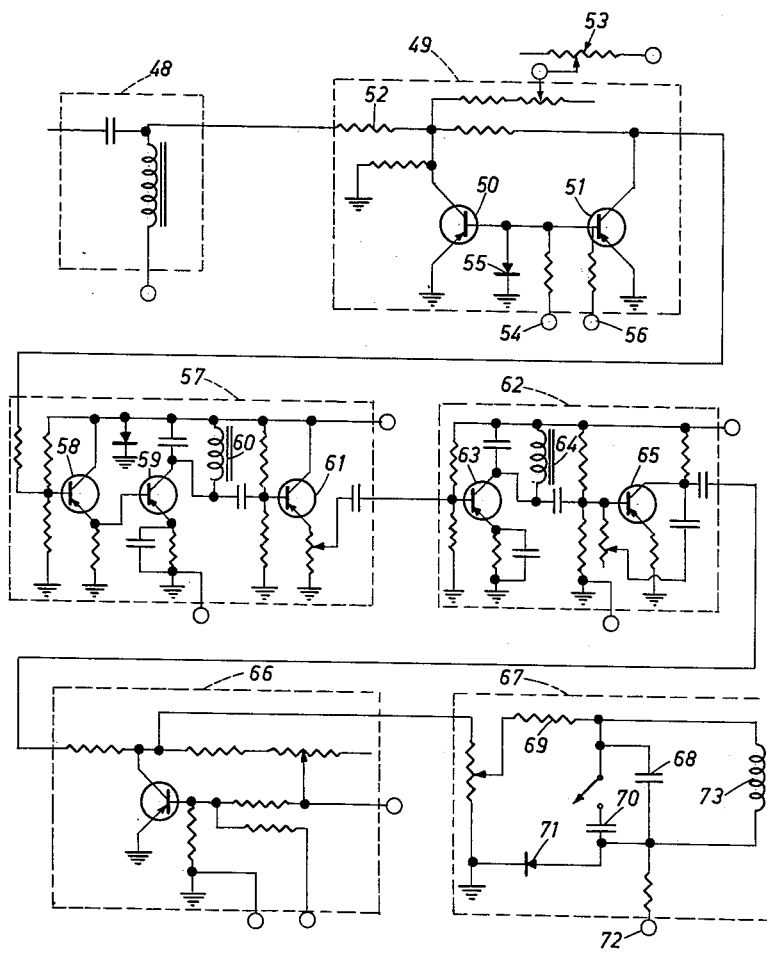
FIGURE 19 shows a schematic wiring diagram of one channel of the receiving portion of the receiver in a form suitable for use with the present invention.

The circuitry of a complete channel less the coil and pre-amplifier is illustrated in FIGURE 19. The signals from the bird preamplifier are fed into a high pass filter 48 of conventional design with a cut off frequency of 5 cycles per second. This filter is designed to reject low frequency signals generated by slow movements of the bird detector coils in the earth's magnetic field. The signal passes from the filter into the first detector 49. The first detector is a sampling gate consisting essentially of two transistor switches 50 and 51 in cascade relationship with one another. The transistors 50 and 51 are type 2N518, which are low noise fast switching PNP transistors each of which switches the signal to ground, two being used in cascade to ensure optimum effect. A resistor 52 provides isolation from the reactance circuitry of the filter 48.

A balancing control 53 is provided for adjusting the amount of voltage pedestal produced by the switch and is a special feature of the circuitry used for zeroing the D.C. output of the system appearing after the second detector and integrator. The gate pulse which controls the switching action is fed in at 54, its level being regulated by the Zener diode 55. A D.C. bias is fed in at 56 to make the transistors 50 and 51 normally conduct, the transistors then being switched off by the gate pulse applied at 54. The detector or sampling gtae 49 is designed to have greater than 40 db rejection in its shorted condition. The signal is passed from the first detector 49 to the first tuned amplifier 57. Transistor 58 is a 2N44 PNP type and acts as a buffer between the output of the first detector and transistor 59 which is also a 2N44 and acts as a tuned amplifier in conjunction with the high Q toroidal inductor 60. The tuned amplifier is tuned to the transmitted pulse repetition rate. Transistor 61 is a 2N44 type which acts as a further buffer between the first tuned amplifier 57 and the second tuned amplifier 62. Transistor 63 is a type 2N44 and together with inductor 64 forms a further tuned amplifier tuned to the transmitted pulse repetition rate. Transistor 65 is a type 2N44 transistor used as an audio amplifier of high dynamic range and feeds into the second detector switch 66. This switch is a single section switch similar in type to each of the switches used in the first detector 49. It functions as a gated sampler of the sine wave output from the tuned amplifiers and as such is in the nature of a phase detector. The switch features a wide dynamic range to cope with the considerable variations in amplitude which in practice appear in the system. The second detector feeds into a low pass filter 67 which acts as a simple integrator of the pulses delivered by the second detector 66. The values of the capacitor 68 and resistor 69 are chosen to provide suitable time constants and an additional capacitor 70 may be switched in to provide an alternative longer time constant. Typical values of time constants chosen are two seconds and four seconds. The Zener diode 71 provides a regulated bias voltage derived from voltage applied at 72, said voltage being used to maintain correct polarity on the electrolytic capacitors used for convenience in the integrator. The coil of the mirror galvanometer used in the recorder is shown at 73. As noted previously, the pedestal of the first detector gate may be used to control the D.C. output of the integrator to the mirror galvanometer. The first detector gate is locked in time relationship to the transmitted pulse and the pedestal output therefore energizes the tuned amplifiers at their resonant frequency and in coherent phase relationship. The balance control 53 adjusts the gate pedestal and will therefore exercise control on the amplitude of the sine wave signal generated by the tuned amplifiers. This sine wave output of the tuned amplifiers is subsequently detected by the second detector and fed to the integrator 67. Hence by adjusting the pedestal using the balance control 53, the output of the integrator may be varied and the mirror galvanometer thereby conveniently zeroed.

The above references to component types are according to American manufacturers' standard classification.

The invention has been described having particular reference to the use of a transmitted signal in the form of a half sine wave pulse generated at a repetition rate of 80 per second. The half sine wave shape has been chosen because it is a realtively simple and efficient discontinuous wave form to generate. Using this shape a pulse length of not less than 1 millisecond is required to obtain efficient energization of good conductors in the ground which typically exhibit time constants in the region of 500 microseconds. Shorter pulses will reach peak amplitude too rapidly to energize said ground conductors fully. On the other hand long pulses greater than 3 milliseconds in length are excessively wasteful of power and little or no additional energy is induced into the ground conductors by prolonging the pulses unduly. Furthermore if a half sine wave of greater than 3 milliseconds in length is used the slow decay of the pulse minimizes transient effects.

It is desirable to have at least 1 millisecond following waveform discontinuities such as the termination of a pulse in which to measure transient effects. Thus if half sine pulses are used a maximum practical repetition rate is 500 per second using 1 millisecond pulses and 1 millisecond intervals between pulses. Using the circuitry described, the lower limit is set at about 40 per second since the inductively tuned amplifiers which have been used become very inefficient below this frequency. However a minor modification to the circuitry in which conventional R.C. tuned amplifiers are substituted for inductively tuned amplifiers enables pulse repetition rates as low as 1 per second to become perfectly practical. In order to achieve the same efficiency and signal to noise ratio at differing reptition rates it is merely necessary to keep the average power dissipated in the radiating loop the same. Thus at low repetition rates much higher peak powers are required and vice versa. The lower rate of repetition is ultimately set by consideration of the rate of traverse of the survey aircraft over the ground; for example, the maximum desirable interval between measurements at 100 m.p.h. would be about 1 per second.

Wave shapes other than half sine pulses may be employed without any departure in principle from the procedures outlined. Suitable wave shapes include sawtooth forms, square pulses and any wave form exhibiting discontinuities or departure from simple harmonic functions when followed by periods in which the primary field is not time varying. Modifications to the transmitter can be carried out by one skilled in the art to change the transmitted shape to alternative configurations. If discontinuities are applied at regular periodic intervals then circuitry identical to that described here can be used in the receiving system, the tuned amplifiers of the system being tuned to the periodicity of the transmitted discontinuities, and the gates being triggered in fixed time relationships to the primary field discontinuities.

Discontinuities may also be triggered at random intervals providing the receiving system is triggered in locked time relationship to the transmitted system. The only modification required to the receiving system is the substitution of wideband, wide dynamic range, A.C. amplifiers for the tuned amplifiers. By way of example, triggering may be accomplished by using a zero-crossing detector on one of the receiving coils to provide trigger pulses only when zero volts exist in the detector coils. This type of technique can be used as an alternative to a high pass filter as a means of eliminating low frequency noise due to low frequency movements of the bird and its receiving coils in the earth's magnetic field.

It will be appreciated to those skilled in the art that variations and modifications may be made without departing from the scope of the invention as defined in the following claims.

What I claim is:

1. The method of detecting conducting bodies, and comprising: initiating primary waveforms exhibiting abrupt discontinuities at predetermined intervals from a moving source; radiating said primary waveforms towards areas in which conducting bodies are to be detected, thereby to induce secondary electromagnetic waveforms emanating from said conducting bodies; moving receiving means at a velocity substantially equal to that of the moving source; receiving said primary waveforms and secondary reradiated transient effects emanating from conducting bodies energized by said primary waveforms and discerning said received signals in three component directions mutually at right angles, one of said components being horizontal and substantially at right angles to the direction of motion of the source; sampling at least one portion of each said resolved discerned transient effects after the abrupt discontinuities in the primary waveform; sampling at least one further portion of one individual component discerned transient effect; and separately amplifying and recording at least a portion of said sampled portions thereby to detect the presence of secondary transient effects emanating from conducting bodies energized by said primary waveform whereby the presence of said conducting bodies is indicated.

2. The method of detecting conducting bodies, and comprising: initiating primary waveforms exhibiting abrupt discontinuities at predetermined intervals by means of a pulse of generally half sine wave shape; radiating said primary waveforms towards areas in which conducting bodies are to be detected thereby to induce secondary transient effects emanating from conducting bodies energized by said primary waveforms; receiving said primary waveforms and said secondary transient effects filtering out extraneous received signals; sampling portions of said secondary transient effects at intervals locked in time relationship to the predetermined abrupt discontinuities in the primary waveforms; passing said sampled portions through an amplification stage tuned to the same frequency as the repetitionary of said abrupt discontinuities in the primary waveforms; further sampling portions of the amplified signal; integrating said last mentioned waveforms into a fluctuating direct current; and utilizing said current to operate a recorder producing a recording related to the received secondary transient signals thereby indicating their presence.

3. The method of detecting conducting bodies as claimed in claim 2 including the steps of triggering said abrupt discontinuities in the primary waveforms and said sampled portions of the received signal in predetermined time relationship.

4. The method of detecting conducting bodies and comprising: initiating primary electromagnetic waveforms from a source by means of a pulse of between about 0.5 to 5 milliseconds' duration, said waveforms exhibiting abrupt discontinuities at predetermined intervals thereby to induce transient secondary electromagnetic waveforms emanating from said conducting bodies delayed a short time after said abrupt discontinuities of said primary waveforms, receiving said primary waveforms; and said delayed transient secondary waveforms sampling at least one portion of said delayed transient secondary waveforms at a predetermined time interval after said abrupt discontinuities in said primary waveforms; and recording the presence of such sampled portions thereby to indicate the presence of conducting bodies.

5. The method of detecting conducting bodies and comprising: initiating primary electromagnetic waveforms from a source by means of a pulse of generally half sine wave shape, said waveforms exhibiting abrupt discontinuities at predetermined intervals thereby to induce transient secondary electromagnetic waveforms emanating from said conducting bodies delayed a short time after said abrupt discontinuities of said primary waveforms; receiving said primary waveforms and said delayed transient secondary waveforms; discerning said delayed transient secondary waveforms in three component directions mutually at right angles thereby to provide three resolved components thereof; sampling at least one portion of said resolved components at a predetermined time interval after said abrupt discontinuities in said primary waveforms; and recording the presence of such sampled portions thereby to indicate the presence of conducting bodies.

6. The method of detecting conducting bodies as claimed in claim 5, in which one of the discerned components is arranged to be substantially horizontal.

7. The method of detecting massive and disseminated ore deposits and other like electrically polarisable bodies and comprising: initiating primary electromagnetic waveforms from a source by means of a pulse of between 0.5 to 5 milliseconds' duration, said waveforms exhibiting abrupt discontinuities at predetermined intervals thereby to induce transient polarization in said body characterized by transient polarization effects emanating therefrom delayed a short time after said abrupt discontinuities of said primary waveforms; receiving said primary waveforms and said delayed transient effects; sampling at least one portion of said delayed transient effects at predetermined intervals after said abrupt discontinuities in said primary waveforms, and recording the presence of such sampled portions thereby to discriminate the response of said polarizable body from adjacent non-polarizable bodies of similar conductivity.

8. The method of detecting massive and disseminated ore deposits and other like electrically polarizable bodies and comprising; initiating primary electromagnetic waveforms from a source, by means of a pulse of between about 0.5 to 5 milliseconds' duration, said waveforms exhibiting abrupt discontinuities at predetermined intervals thereby to induce transient polarization in said body characterized by transient polarization effects emanating therefrom delayed a short time after said abrupt discontinuities of said primary waveforms; receiving said primary waveform and said delayed transient effects; discerning said delayed transient effects in three component directions mutually at right angles thereby to provide three resolved components thereof; sampling at least one portion of said resolved components at predetermined intervals after said abrupt discontinuities in said primary waveforms, and recording the presence of such sampled portions thereby to discriminate the response of said polarizable body from adjacent non-polarizable bodies of similar conductivity.

9. Apparatus for the remote detection of conducting bodies comprising: signal generating means for radiating primary electromagnetic waveforms by means of a pulse of between about 0.5 to 5 milliseconds' duration exhibiting abrupt discontinuities at predetermined intervals; receiving means for discerning secondary signals induced by said primary waveforms and reradiated by a conducting body together with transient components of said secondary signals occurring after said abrupt discontinuities in said primary waveforms; adjustable electronic detection means normally blocking said signals and operable intermittently to sample portions of said transient components; amplifier means amplifying said sampled portions; second adjustable detector means operable to sample portions of the amplified signal from said amplifier means; means integrating said last mentioned sampled portions; and means for recording said integrated signals, thereby to provide evidence of the presence of conducting bodies.

10. Apparatus for the remote detection of conducting bodies comprising: signal generating means for radiating primary electromagnetic waveforms exhibiting abrupt discontinuities at predetermined intervals; inductive receiving means discerning secondary signals induced by said primary waveforms and reradiated by a conducting body and secondary transient components of said secondary signals occurring after said abrupt discontinuities in said primary waveforms; adjustable electronic detection means normally blocking said signals and operable intermittently to sample portions of said discerned secondary transient components during the absence of said primary waveform; amplifier means amplifying said sampled portions of said discerned signals; integrator means integrating said last mentioned sampled portions into a slowly fluctuating direct current; and recording means for recording said integrated signals, thereby to provide evidence of the presence of conducting bodies.

11. Apparatus for the remote detection of conuducting bodies comprising: signal generating means for radiating primary electromagnetic waveforms exhibiting abrupt discontinuities at predetermined intervals; inductive receiving means discerning secondary signals induced by said primary waveforms and reradiated by a conducting body and secondary transient components of said secondary signals occurring after said abrupt discontinuities in said primary waveforms; adjustable detection means normally blocking said signals and operable intermittently to sample portions of said discerned secondary transient components following the said abrupt discontinuities in the primary waveform; amplifier means amplifying said sampled portions of said discerned signals; second adjustable detector means for sampling portions of the amplified signal from said last mentioned sampled portions; integrator means integrating said last mentioned sampled portions into a slowly fluctuating direct current; and recording means for recording said integrated signals, thereby to provide evidence of the presence of conducting bodies.

12. Apparatus for the remote detection of conducting bodies comprising: transmitter means generating a primary electromagnetic waveform exhibiting abrupt discontinuities at a predetermined frequency; inductive receiving means for discerning secondary signals induced by said primary waveforms and reradiated by a conducting body together with any transient components of said secondary signals occurring after said abrupt discontinuities in said primary waveforms; amplification means amplifying said discerned signals; adjustable means filtering said discerned signals; adjustable detection means normally blocking said signals and operable intermittently to sample portions of said discerned secondary transient components following said discontinuities in the primary electromagnetic waveform; tuned amplifier means amplifying said sampled portions of said discerned signals, said amplifier means being tuned to the frequency of said abrupt discontinuities in the primary waveform; second adjustable detector means for sampling portions of the amplified signal from said tuned amplifier means; means integrating said last mentioned sampled portions; and recording means for recording said integrated signals, thereby to provide graphic evidence of the presence of conducting bodies.

13. Apparatus for the remote detection of conducting bodies comprising: a discontinuous waveform transmitter for transmitting primary electromagnetic waveforms exhibiting abrupt discontinuities at a predetermined frequency; at least one coil receiving means for discerning secondary signals induced by said primary waveforms and reradiated by a conducting body and transient components of said signals occurring after said abrupt discontinuities in said primary waveforms; pre-amplifier means amplifying said discerned signals; first detector gate means, said first detector being adjustable to sample predetermined portions of said pre-amplified discerned secondary transient components; tuned amplifier means amplifying said sampled portions, said last mentioned amplifier means being tuned to the frequency of said abrupt discontinuities in the primary waveform; second detector gate means adjustable to sample predetermined portions of the signal from said tuned amplifier means; high sensitivity recording means; and low pass filter integrator means converting the signals received from said second detector gate means to a slowly fluctuating D.C. signal, said last mentioned signal being utilized to energize said recorder thereby to form a record of varying form said form being related to the secondary transient components induced by the energization of a conducting body.

14. Apparatus for the detection of conducting bodies as claimed in claim 13 in which is provided at least two coil receiving means having their axes disposed mutually at right angles, the signals discerned by said coils being recorded by means of separate circuits.

15. Apparatus for the detection of conducting bodies as claimed in claim 14 in which said first detector gate means comprises at least two separate detector gates sampling portions of a transient secondary component at predetermined intervals.

16. Apparatus for the remote detection of conducting bodies comprising: a discontinuous waveform transmitter for transmitting primary electromagnetic waveforms exhibiting abrupt discontinuities at a predetermined frequency; a vertical transverse receiving coil; a vertical longitudinal receiving coil; a horizontal receiving coil, said receiving coils being arranged with their axes mutually perpendicular respectively to discern components of signals reradiated by a conducting body together with secondary transient signals occurring after said abrupt discontinuities in said primary waveforms; pre-amplifier means amplifying said discerned signals in said receiver coils; first detector gate means, each said means sampling a predetermined portion of said pre-amplified discerned secondary transient signals; tuned amplifier means separately amplifying each said sampled portion, said last mentioned amplifier means being tuned to the frequency repetition of said abrupt discontinuities in the primary waveform; separate second detector gate means sampling the peak portions of the signals from said second detector gate means; high sensitivity recording means; and low pass filter integrator means separately converting the signals received from each said second detector means to a slowly fluctuating direct current signal, each said last mentioned signals being utilized separately to actuate said recording means thereby to provide a record of varying form said form being related to the sampled portion of the secondary transient signals discerned in said coils.

17. Apparatus for the remote detection of conducting bodies as claimed in claim 16 wherein said first detector gate means are provided to sample portions of said discerned secondary transient signals immediately following said abrupt discontinuities in the primary waveform, and further first detector gate means are provided to sample at least one other portion of said discerned secondary transient signals for at least one of said coils.

18. Apparatus for the remote detection of conducting bodies as claimed in claim 17 wherein there is provided triggering means activating said first and said second detector gate means in adjustably predetermined time relationship to said abrupt discontinuities in the primary electromagnetic waveform.

References Cited in the file of this patent

UNITED STATES PATENTS

| | | |
|---|---|---|
| Re. 24,464 | Yost | Apr. 22, 1958 |
| 2,190,322 | Potapenko | Feb. 13, 1940 |
| 2,527,559 | Lindblad et al. | Oct. 31, 1950 |
| 2,729,790 | Haynes | Jan. 3, 1956 |
| 2,735,980 | Wait | Feb. 21, 1956 |
| 2,811,693 | Holzwarth et al. | Oct. 29, 1957 |
| 2,839,727 | Lozier | June 17, 1958 |

OTHER REFERENCES

Bell System Technical Journal, vol. 27, 1948; pp. 26, 27.